(12) United States Patent
Nagahori

(10) Patent No.: US 6,466,347 B1
(45) Date of Patent: Oct. 15, 2002

(54) BINARY OPTICAL TRANSMISSION SYSTEM

(75) Inventor: Takeshi Nagahori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/252,275

(22) Filed: Feb. 18, 1999

(30) Foreign Application Priority Data

Feb. 18, 1998 (JP) .......................................... 10-035298

(51) Int. Cl.$^7$ .............................................. H04B 10/00
(52) U.S. Cl. ....................... 359/158; 359/154; 359/173; 359/181
(58) Field of Search ................................. 359/154, 158, 359/173, 180–181, 184

(56) References Cited

U.S. PATENT DOCUMENTS 5,617,235 A * 4/1997 Abrahamson ................ 359/142

* cited by examiner

*Primary Examiner*—Kinfe-Michael Negash
(74) *Attorney, Agent, or Firm*—Scully, Scott, Murphy & Presser

(57) ABSTRACT

Disclosed is a binary optical transmission system for transmitting and receiving a target transmit data to be transmitted as a binary optical transmit data composed of luminous part and non-luminous part, wherein the target transmit data is transmitted and received by a coding to use a transmission code that the ratio of time of luminous part to time of non-luminous part in a time section longer than one cycle of a transmission clock used to transmit the target transmit data is less than 1.

32 Claims, 9 Drawing Sheets

FIG.2 PRIOR ART

| NUMBER OF '1' | NUMBER OF '0' | NUMBER OF COMBINATION | APPLIED/ UNAPPLIED |
|---|---|---|---|
| 0 | 10 | 1 | UNAPPLIED |
| 1 | 9 | 10 | |
| 2 | 8 | 45 | |
| 3 | 7 | 120 | |
| 4 | 6 | 210 | APPLIED AS 8B10B-BLOCKED CODE |
| 5 | 5 | 252 | |
| 6 | 4 | 210 | |
| 7 | 3 | 120 | UNAPPLIED |
| 8 | 2 | 45 | |
| 9 | 1 | 10 | |
| 10 | 0 | 1 | |

FIG.4

| NUMBER OF '1' | NUMBER OF '0' | NUMBER OF COMBINATION | APPLIED/ UNAPPLIED |
|---|---|---|---|
| 0 | 15 | 1 | UNAPPLIED |
| 1 | 14 | 15 | APPLIED AS 12B15B-BLOCKED CODE |
| 2 | 13 | 105 | |
| 3 | 12 | 455 | |
| 4 | 11 | 1365 | |
| 5 | 10 | 3003 | |
| 6 | 9 | 5005 | UNAPPLIED |
| 7 | 8 | 6435 | |
| 8 | 7 | 6435 | |
| 9 | 6 | 5005 | |
| 10 | 5 | 3003 | |
| 11 | 4 | 1365 | |
| 12 | 3 | 455 | |
| 13 | 2 | 105 | |
| 14 | 1 | 15 | |
| 15 | 0 | 1 | |

FIG.5

| NUMBER OF '1' | NUMBER OF '0' | NUMBER OF COMBINATION | APPLIED/ UNAPPLIED |
|---|---|---|---|
| 0 | 10 | 1 | UNAPPLIED |
| 1 | 9 | 10 | APPLIED AS 8B10B-BLOCKED CODE |
| 2 | 8 | 45 | |
| 3 | 7 | 120 | |
| 4 | 6 | 210 | |
| 5 | 5 | 252 | UNAPPLIED |
| 6 | 4 | 210 | |
| 7 | 3 | 120 | |
| 8 | 2 | 45 | |
| 9 | 1 | 10 | |
| 10 | 0 | 1 | |

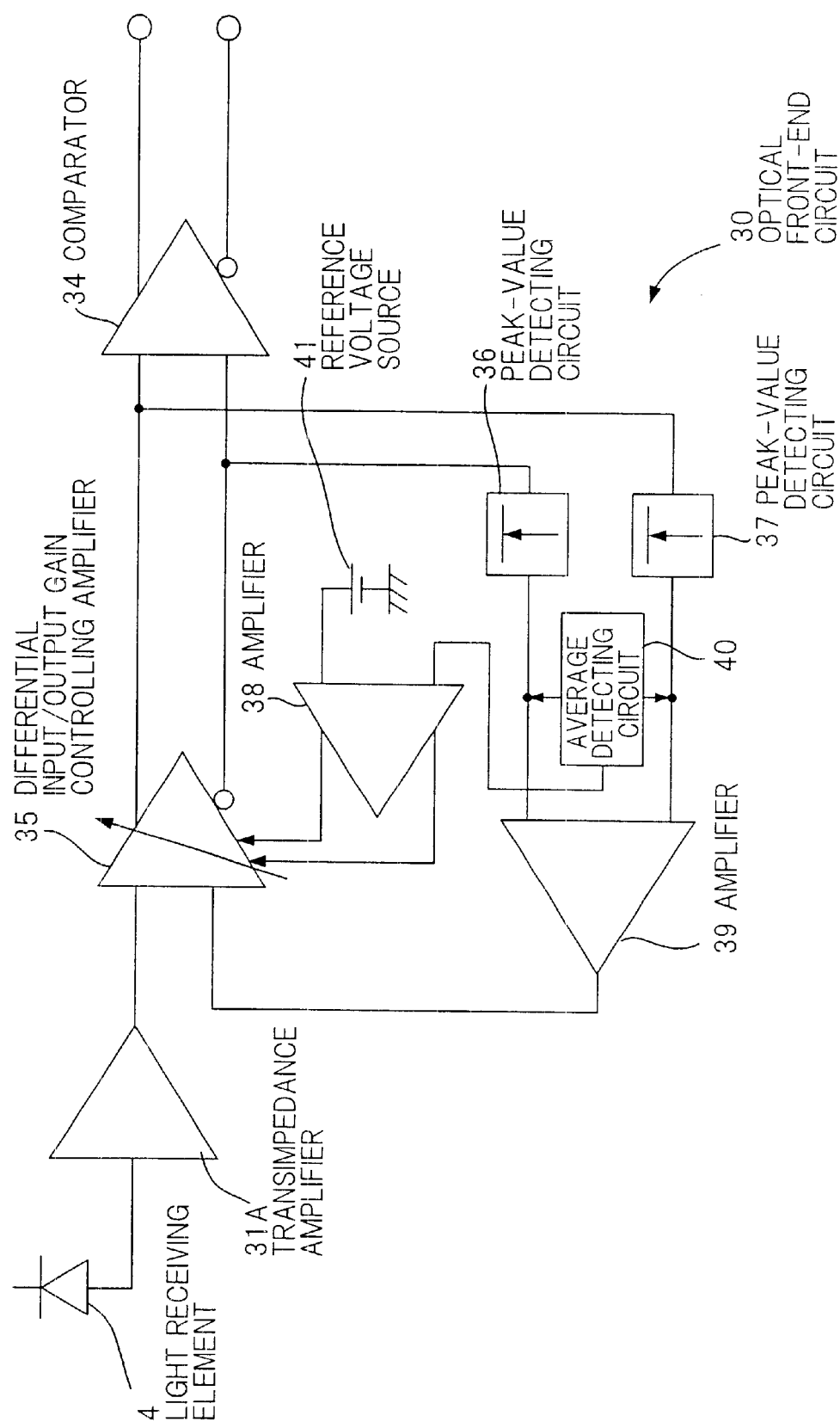

BINARY OPTICAL TRANSMISSION SYSTEM

FIELD OF THE INVENTION

This invention relates to an optical PCM (pulse code modulation) transmission system, and more particularly to, a binary optical transmission system for optical data link, such as multi-channel optical link where multiple light-emitting elements are integrated, optical wireless transmission and plastic-fiber optical link.

BACKGROUND OF THE INVENTION

FIG. 1 shows the composition of a conventional optical data link using PCM transmission system. In the conventional optical data link in FIG. 1, an encoding circuit 10 conducts the encoding that, by scramble or block-coding, the ratio of bit number of luminous parts and bit number of non-luminous parts in a certain time section is made 1:1. For example, in 8B10B encoding method used in Fibre Channel etc., as shown in FIG. 2, when encoding 8-bit binary data sequence (256 kinds) into 10-bit binary data sequence (1024 kinds), combinations that both logic '1' and logic '0' are of five bits, combinations that logic '1' and logic '0' are of four bits and six bits, respectively, and combinations that logic '1' and logic '0' are of six bits and four bits, respectively, are applied as data sequences after encoding so, the optical transmission is conducted using this applied encoding. The other combinations are not used for the optical transmission.

Also, in FIG. 1, an amplifier 5 and a binary quantization circuit 6 are AC-coupled using capacitor 42, and a RC integrator 44 to cancel the internal offset of the binary quantization circuit 6 is added. With such a composition, a simple optical reception front-end circuit 30A can be applied.

However, in optical data links, the output power of transmit light is restricted by safety and the lifetime and consumed power of light-emitting element, and the minimum level of receive light is restricted not only by the internal noise of receiver but also by the interference of extraneous white light or electrical crosstalk. In multi-channel optical link, optical wireless transmission and plastic-fiber optical link, a light source with 850 [nm] or 650 [nm] band rather than 1300 [nm] band is preferably used for the low cost strategy. Therefore, the restriction of light output power for safety to eyes is around single-digit stricter than that at 1300 [nm] band. Also, with regard to the lifetime, the reliability in using a semiconductor laser with this wavelength band as a light source needs to be enhanced, comparing with 1300 [nm] band. For the optical wireless communication at 850 [nm] band, since the wavelength is relatively close to the visible region, there is a disadvantage that the enhancement in minimum level of receive light is limited by the interference of white light.

Also, in the transmitter for multi-channel optical link, the restriction of light output power on safety is calculated based on the sum of the light output powers of respective channels and the radiation angle. Therefore the output-power restriction per one channel is nearly the reciprocal of the number of channels, comparing with a single-core optical transmitter. On the other hand, in the receiver, there is a problem that, due to the electrical crosstalk between channels, the minimum level of receive light becomes very difficult to improve.

SUMMARY OF THE INVENTION

Accordingly, it is an object of the invention to provide an optical transmission system that the restriction for the output power of transmit light and the restriction for the minimum level of receive light can be overcome to enlarge the transmitter-receiver allowable loss and to enhance the transmission speed and transmission distance According to the invention, provided is a binary optical transmission system for transmitting and receiving a target transmit data to be transmitted as a binary optical transmit data composed of luminous part and non-luminous part wherein the target transmit data is transmitted and received by a coding to use a transmission code that the ratio of time of luminous part to time of non-luminous part in a time section longer than one cycle of a transmission clock used to transmit the target transmit data is less than 1.

According to another aspect of the invention, provided is a binary optical transmission system for transmitting and receiving an arbitrary bit sequence as a binary optical transmit data composed of luminous part and non-luminous part, wherein the bit sequence is transmitted by a coding that converts the bit sequence into a bit sequence that the ratio of bit number of luminous part to bit number of non-luminous part in a time section longer than one cycle of a transmission clock used to transmit the bit sequence is less than 1.

According to another aspect of the invention, provided is a binary optical transmission system for transmitting and receiving a target transmit data to be transmitted as a binary optical transmit data composed of luminous part and non-luminous part through each of multiple transmit-receive channels composing a multi-channel optical data link, wherein the target transmit data is transmitted and received by a coding to use a transmission code that the ratio of the sum of time of luminous part at each of the multiple transmit-receive channels to the sum of time of non-luminous part at each of the multiple transmit-receive channels in a time section longer than one cycle of a transmission clock used to transmit the target transmit data at each of the multiple transmit-receive channels is less than 1.

According to another aspect of the invention, provided is a binary optical transmission system for transmitting and receiving an arbitrary bit sequence as a binary optical transmit data composed of luminous part and non-luminous part through each of multiple transmit-receive channels composing a multi-channel optical data link, wherein the bit sequence is transmitted by a coding that converts the bit sequence into a bit sequence that the ratio of the sum of bit number of luminous part to the sum of bit number of non-luminous part in a time section longer than one cycle of a transmission clock used to transmit the bit sequence at each of the multiple transmit-receive channels is less than 1.

According to another aspect of the invention, a binary optical transmission system for transmitting and receiving a target transmit data to be transmitted as a binary optical transmit data composed of luminous part and non-luminous part, comprises:

a transmission unit for transmitting the target transmit data by a coding to use a transmission code that the ratio of time of luminous part to time of non-luminous part in a time section longer than one cycle of a synchronous clock for the target transmit data is less than 1; and a reception unit composed of means for detecting a nearly intermediate value between the peak value and the bottom value of a waveform of binary data waveform, and means for determining the logic level of the binary data using the detected intermediate value.

According to another aspect of the invention, a binary optical transmission system for transmitting and receiving an arbitrary bit sequence as a binary optical transmit data composed of luminous part and non-luminous part, comprises:

a transmission unit for transmitting the bit sequence by a coding to convert the bit sequence into a bit sequence that the ratio of bit number of luminous part to bit number of non-luminous part in a time section longer than one cycle of a transmission clock used to transmit the bit sequence is less than 1; and a reception unit composed of means for detecting a nearly intermediate value between the peak value and the bottom value of a waveform of binary data, and means for determining the logic level of the binary data using the detected intermediate value.

According to another aspect of the invention, a binary optical transmission system for transmitting and receiving a target transmit data to be transmitted as a binary optical transmit data composed of luminous part and non-luminous part through each of multiple transmit-receive channels composing a multi-channel optical data link comprises:

a transmission unit for transmitting the target transmit data by a coding to use a transmission code that the ratio of the sum of time of luminous part to the sum of time of non-luminous part in a time section longer than one cycle of a transmission clock used to transmit the target transmit data at each of the multiple transmit-receive channels is less than 1; and a reception unit composed of means for detecting a nearly intermediate value between the peak value and the bottom value of a waveform of binary data, and means for determining the logic level of the binary data using the detected intermediate value.

According to another aspect of the invention, a binary optical transmission system for transmitting and receiving an arbitrary bit sequence as a binary optical transmit data composed of luminous part and non-luminous part through each of multiple transmit-receive channels composing a multi-channel optical data link, comprises:

a transmission unit for transmitting the bit sequence by a coding to convert the bit sequence into a bit sequence that the ratio of the sum of bit number of luminous part to the sum of bit number of non-luminous part in a time section longer than one cycle of a transmission clock used to transmit the bit sequence at each of the multiple transmit-receive channels is less than 1; and a reception unit composed of means for detecting a nearly intermediate value between the peak value and the bottom value of a waveform of binary data, and means for determining the logic level of the binary data using the detected intermediate value.

In brief, in this invention conducted is the coding that the ratio of bit number of luminous part to bit number of non-luminous part in a time section sufficiently longer than the clock cycle is less than 1 or the coding that the ratio of the sum of bit number of luminous part to the sum of bit number of non-luminous part in a time section sufficiently longer than the clock cycle is less than 1. Then, for the reception of original signal under such coding, the powers of luminous part and non-luminous part in the receive pulse sequence are detected and the logic levels are determined whether to be '1' or '0' by using the detected values. By operating thus, the restriction for the output power of transmit light by safety and the lifetime and consumed power of light-emitting element, and the restriction for the minimum level of receive light by the interference of extraneous white light or electrical crosstalk can be overcome, therefore the transmitter-receiver allowable loss can be enlarged.

BRIEF DESCRIPTION OF THE DRAWINGS

The invention will be explained in more detail in conjunction with the appended drawings, wherein:

FIG. 2 is a table showing an example of combination of binary-encoded sequence applicable to conventional optical transmission systems, FIG. 4 is a table showing an example of combination of binary-encoded sequence applicable to the optical transmission system in the embodiment according to the invention, FIG. 5 is a table showing another example of combination of binary-encoded sequence applicable to the optical transmission system in the embodiment, FIG. 7 is a block diagram showing the composition of another example of an optical reception front-end circuit used in the optical link in FIG. 3.

DESCRIPTION OF THE PREFERRED EMBODIMENT

Figure 1:
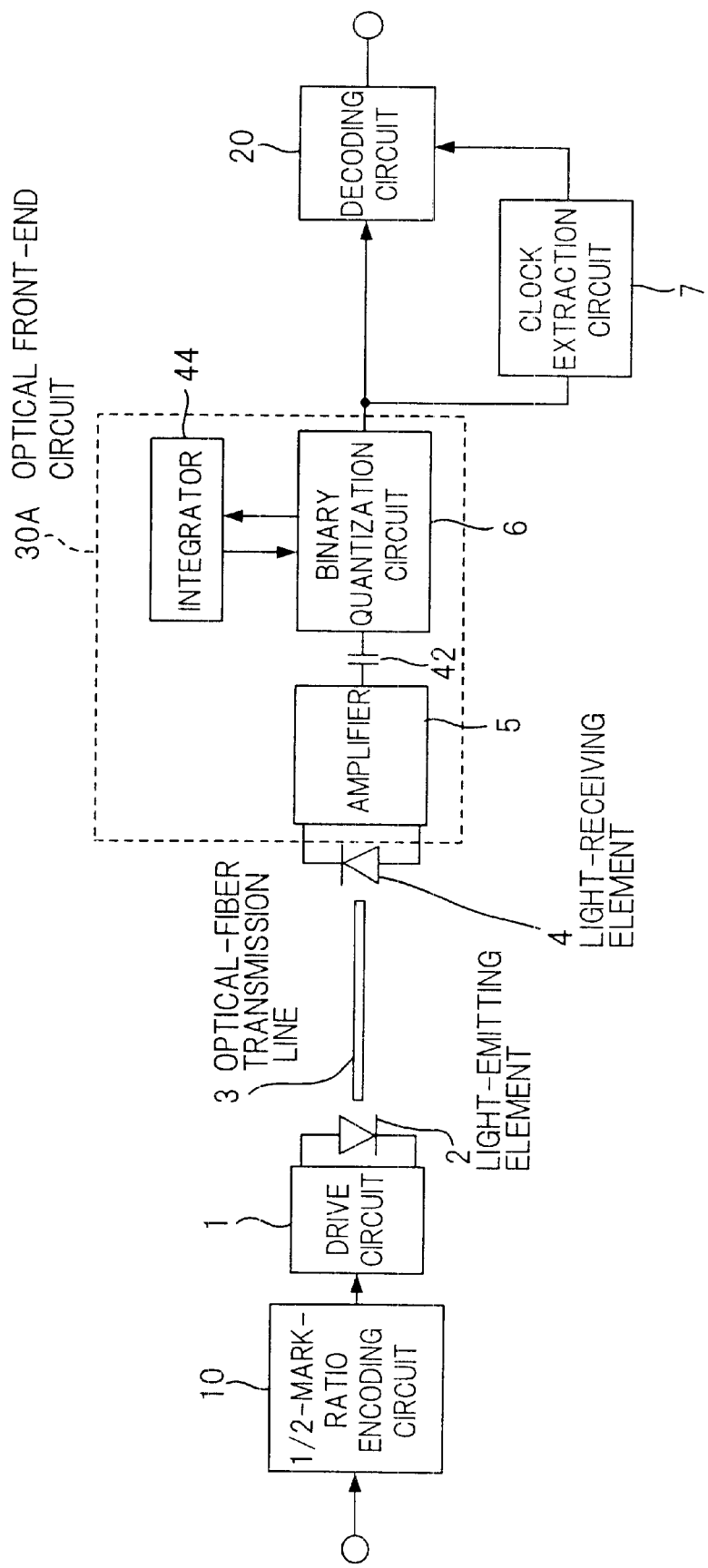
FIG. 1 is a block diagram showing the composition of a conventional optical link.

The preferred embodiment of the invention will be explained below, referring to the drawings.

Figure 3:
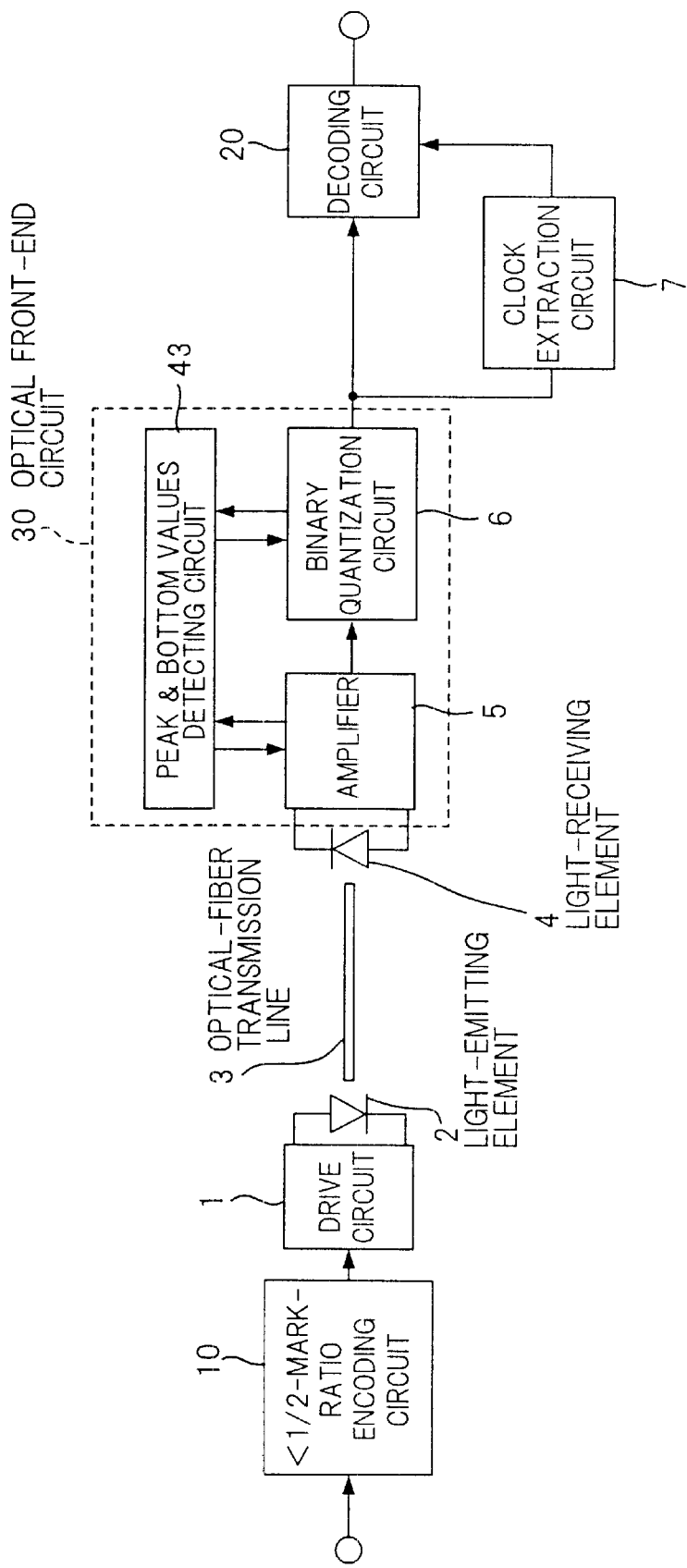
FIG. 3 is a block diagram showing the composition of an optical link using an optical transmission system in a preferred embodiment according to the invention.

FIG. 3 is a block diagram showing the composition of an optical transmission system in the preferred embodiment according to the invention. An encoding circuit 10 conducts the encoding that, by block-coding, the ratio of bit number of luminous parts to bit number of non-luminous parts in a certain time section (time section one hundred times or more longer than one cycle of transmission clock used for transmission) is made less than 1. As shown in FIG. 4, when encoding 12-bit binary data sequence (4096 kinds) into 15-bit binary data sequence (32768 kinds), the block-coding is conducted mapping into binary data sequence of totally 4943 kinds, which are composed of combinations (15 kinds) that logic '1' and logic '0' are of one bit and fourteen bits, respectively, combinations (105 kinds) that logic '1' and logic '0' are of two bits and thirteen bits, respectively, combinations (455 kinds) that logic '1' and logic '0' are of three bits and twelve bits, respectively, combinations (1365 kinds) that logic '1' and logic '0' are of four bits and eleven bits, respectively, and combinations (3003 kinds) that logic '1' and logic '0' are of five bits and ten bits, respectively.

The data sequence encoded is voltage-current-optical-converted by a drive circuit 1 and a light-emitting element 2, transmitted on an optical-fiber transmission line 3. The optical pulse data sequence is optical-current-converted by a light-receiving element 4, current-voltage-converted, then reproduced into digital binary data sequence by a binary quantization circuit 6. At this time, a peak-value and bottom-value detecting circuit 43 detects a voltage level (peak value) of luminous part and a voltage level (bottom value) of non-luminous part and the binary quantization circuit 6 set threshold values used in determining logic levels '1' and '0' referencing these detected values. The quantized binary data sequence is decoded into 12-bit data, for each 15 bits, by a decoding circuit 20, using a clock signal extracted by a clock extraction circuit 7.

Here, the maximum output power of optical transmitter restricted by safety and the lifetime and consumed power of light-emitting element is determined by the time average of transmission power. On the other hand, the minimum power of receive light is determined by the amplitude of input optical signal pulse. Provided that the ratio of luminous bit number to total bit number in a certain time section is defined as mark ratio and the optical power of non-luminous part is zero, the time average of optical power is the product of pulse amplitude and mark ratio.

The mark ratio of original signal in the conventional transmission system is ½. On the other hand, the mark ratio of original signal in the transmission system of this invention is, as shown in FIG. 4, $\frac{1}{10}$ to $\frac{5}{10}$, which is all ½ or less. Therefore, by applying the transmission method of this invention, the time average of optical power corresponding to the minimum amplitude of receive light is reduced to ⅔ or less that in the conventional transmission system. Accordingly, the minimum level of receive light defined by the time average is enhanced 1.8 [dB] and the transmitter-to-receiver allowable loss is also enhanced 1.8 [dB].

In other words, the maximum allowable optical-pulse amplitude corresponding to the time average of maximum allowable transmit-light power is enhanced 3/2 times. Therefore, even when the maximum transmission level defined by the amplitude is enhanced 1.8 [dB], it does not exceed the restriction by safety etc. and the transmitter-to-receiver allowable loss can be enhanced 1.8 [dB].

When applying the block-coding, an increase in overhead by the encoding causes a reduction in transmission efficiency. However, in the present system, the overhead by the encoding is 25%, which is the same as the overhead by 8B10B block-coding that is generally used in the conventional systems. So, there occurs no reduction in transmission efficiency.

Although, in the present system, 12B15B block-coding is used, another coding may be used. For example, even when applying 8B10B block-coding, as shown in FIG. 5, for the number of 8-bit binary data sequences, 256, before encoding, 10-bit binary data sequences obtained are 176 for mark ratio of $\frac{3}{10}$ or less and 386 for less than $\frac{4}{10}$ or less. Accordingly, the transmission can be conducted keeping the mark ratio $\frac{4}{10}$ or less. Thus, the transmitter-to-receiver allowable loss can be enhanced 1.0 [dB].

Although, in the present system, the optical-fiber transmission line 3 is used as optical transmission line, another optical transmission line, e.g., an optical wave guide and space propagation, may be also used.

Figure 6:
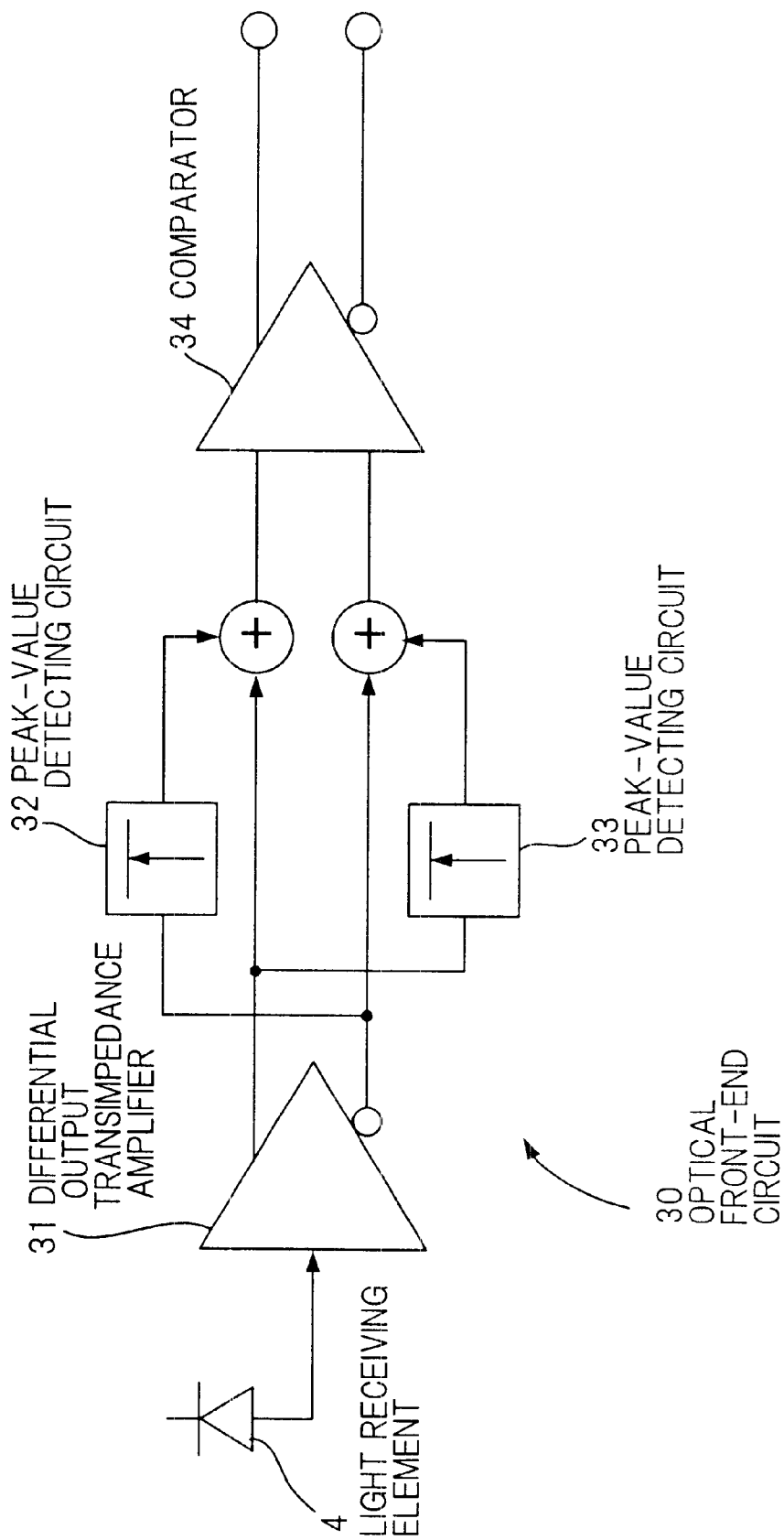
FIG. 6 is a block diagram showing the composition of an example of an optical reception front-end circuit used in the optical link in FIG. 3.

FIG. 6 is a block diagram showing a specific composition of an optical reception front-end circuit 30 in FIG. 3. This composition is described in Japanese patent application laid-open No. 8-84160 (1996).

In this circuit, positive-phase-sequence output of a differential output transimpedance amplifier 31 is detected by a peak-value detecting circuit 33 and negative-phase-sequence output thereof is detected by a peak-value detecting circuit 32. Thus, the peak value and bottom value of optical signal to be input to an optical detector 4 are detected, and the addition-subtraction operation is conducted for the positive-phase-sequence output and negative-phase-sequence output of the differential output transimpedance amplifier 31. the output of the peak-value detecting circuit 32 and the output of the peak-value detecting circuit 33. Thereby, the threshold for determining logic levels '1' and '0' is set at the middle of pulse amplitude regardless of the mark ratio, and is input to a comparator 34.

FIG. 7 is a block diagram showing another composition of the optical reception front-end circuit 30. The output of a transimpedance amplifier 31A is introduced through a differential input/output gain controlling amplifier 35 to the comparator 34. Here, the peak values of positive-phase-sequence and negative-phase-sequence outputs of the differential input/output gain controlling amplifier 35 are detected by a peak-value detecting circuit 37 and a peak-value detecting circuit 36, respectively. An average detecting circuit 40 detects the average value of outputs of the peak-value detecting circuit 37 and the peak-value detecting circuit 36. The detected average value and the output of a reference voltage generating source 41 are compared and amplified by a differential amplifier 38. Then, AGC feedback is conducted such that this amplified output is feedbacked to the gain control input terminal of the differential input/output gain controlling amplifier 35.

Also, the output of the peak-value detecting circuit 37 and the output of the peak-value detecting circuit 36 are compared and amplified by a differential amplifier 39. Then, DC feedback is conducted such that this amplified output is feedbacked to the negative-phase-sequence signal input terminal of the differential input/output gain controlling amplifier 35.

By such AGC feedback and DC feedback, the threshold for determining logic levels '1' and '0' is set at the middle of pulse amplitude regardless of the mark ratio and is input to the comparator 34, thereby enabling the binary quantization. With the integrated-circuit composition, both of the circuits in FIGS. 6 and 7 can be provided inexpensive, free from adjustment and miniaturized.

Figure 8A:
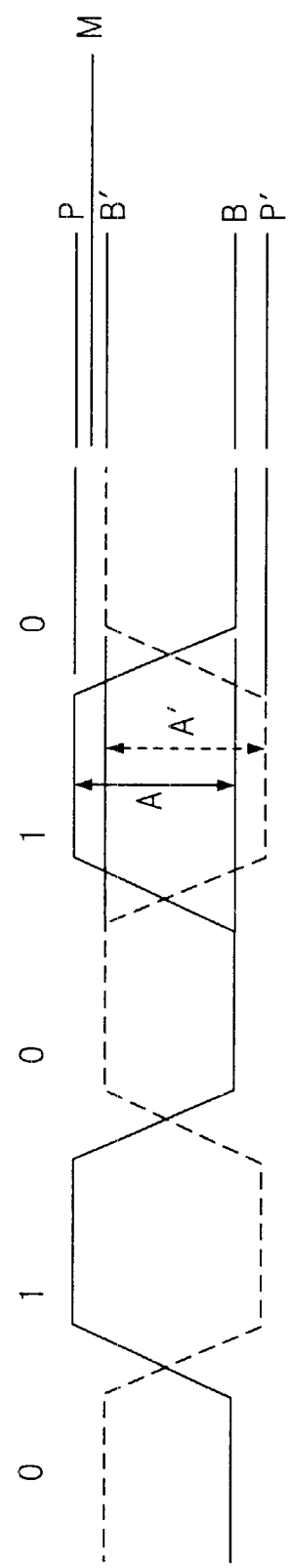
FIG. 8A is a waveform diagram showing the operation of a gain adjusting amplifier in FIG. 7.
Figure 8B:
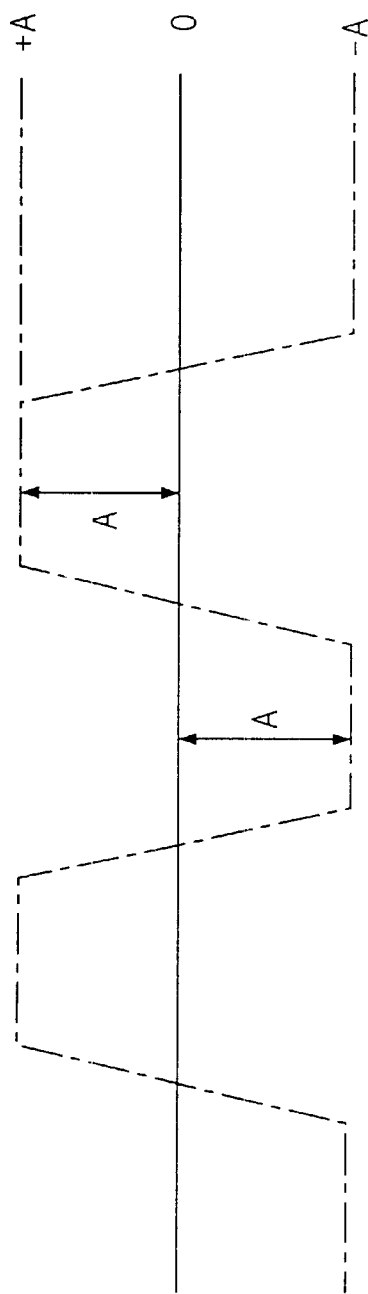
FIG. 8B is an illustration showing the relationship between positive-phase-sequence output and negative-phase-sequence output.

Further, the operations of respective parts of optical reception front-end circuit in FIG. 7 are explained referring to the waveform diagrams in FIGS. 8A and 8B.

In FIG. 8A, the full line indicates the positive-phase-sequence output of the differential input/output gain controlling amplifier 35, and the dotted line indicates the negative-phase-sequence output of the amplifier 35. The peak value P of the positive-phase-sequence output is detected by the peak-value detecting circuit 36, and the bottom value B' of the negative-phase-sequence output is detected by the peak-value detecting circuit 37. Both of the outputs of the peak-value detecting circuits 36, 37 are compared and amplified by the amplifier 39, feedbacked to the negative-phase-sequence input of the differential input/output gain controlling amplifier 35, thereby allowing the peak value P and the bottom value B' to be nearly equal.

Here, it is assumed that the differential input/output gain controlling amplifier 35 conducts linear operation without being subject to the limiting. With such operation, the amplitude A of the positive-phase-sequence output and the amplitude A' of the negative-phase-sequence output in FIG. 8A becomes equal. Therefore, the peak value P' and the bottom value B in FIG. 8A also becomes equal.

The average detecting circuit 40 detects the average value of the peak value P and the bottom value B'. This average value and the reference voltage value M generated by the reference voltage source 41 are compared and amplified by the amplifier 38, feedbacked to the gain control terminal of the differential input/output gain controlling amplifier 35, thereby allowing the average value of the peak value P and the bottom value B' to be equal to the reference voltage value M.

In brief, when guaranteeing the linear operation by setting the reference voltage value M to be smaller than the limiting amplitude of the differential input/output gain controlling amplifier 35, the peak values P, P' and the bottom values B, B' take all a constant value, regardless of the magnitude of amplitude input. When the detection precision of the peak detecting circuit is independent of the mark ratio, the same function is obtained in the present feedback amplification system even when the mark ratio varies. Thus, regardless of the amplitude of input signal and the mark ratio, the difference voltage of the positive-phase-sequence output and negative-phase-sequence output indicated by the one-dotted line in FIG. 8B becomes −A[V] at part of logic '0' and +A[V] at part of logic '1' Namely, the waveform waggles symmetrically being centered with 0[V] and the threshold is always set at the middle of the pulse amplitude.

Figure 9:
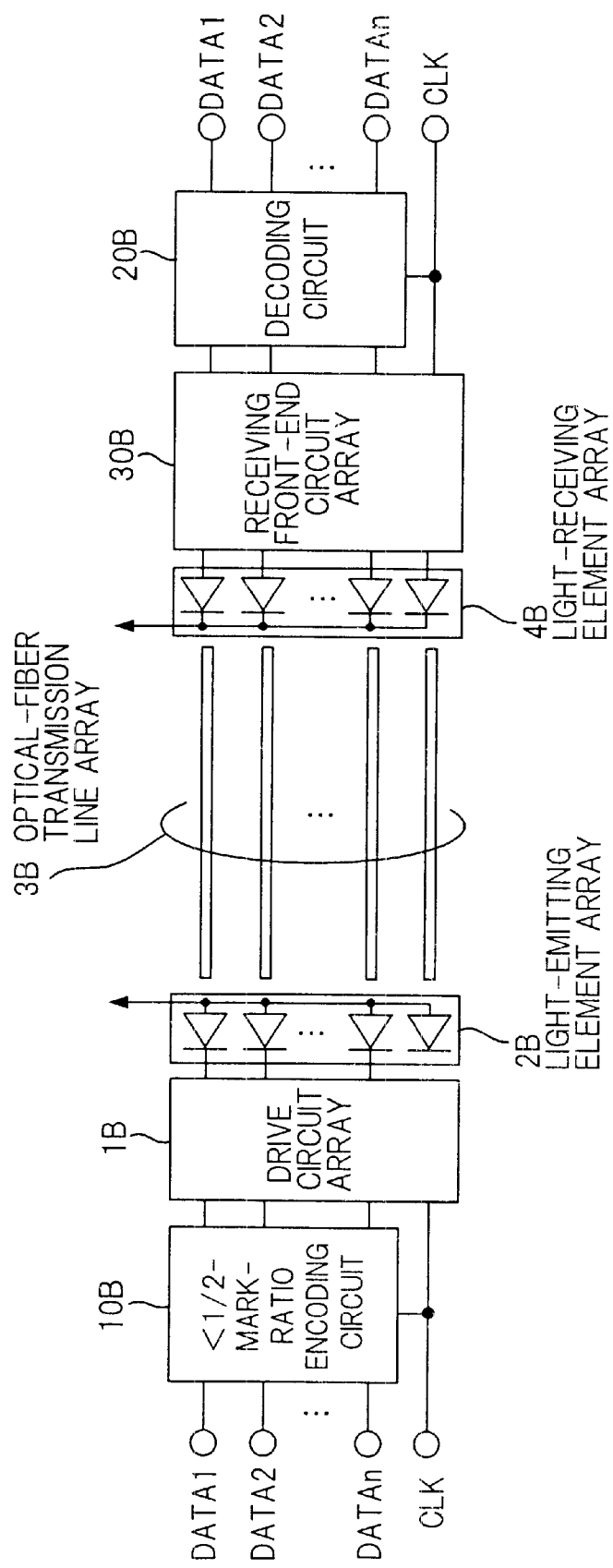
FIG. 9 is a block diagram showing the composition of a multi-channel optical link using the optical transmission system in embodiment according to the invention.

FIG. 9 shows a case that is multi-channeled using the circuit composition in FIG. 3. In FIG. 9, an array optical link composition composed of n data channels and one clock channel is shown. In an encoding circuit 10B, the block-coding is conducted such that, four each 4 time slots, n-channel data is converted into n-channel data of 5 time slots, i.e., 4xn-bit data is converted into 5xn-bit data. This 5xn-bit data is composed of only a sequence with the combination that logic levels '1' are less than 5xn/2 and logic levels '0' is more than 5xn/2.

Now, handled is a parallel data with 8-bit width, which means n is eight. Therefore, 4-clock 8-bit-wide data, i.e., 32-bit data is mapped: into 5-clock 8-bit-wide data, i.e., 40-bit data. This is equivalent to the application of 32B40B block-coding. 40-bit data after encoding is composed of a data sequence that logic levels '1' are 16 or less.

Accordingly, the ratio of the sum of the bit number of luminous parts to the sum of bit number of non-luminous parts of the respective channels is kept less than 1.

The encoded data sequence is voltage-current-optical converted by a (n+1) channel drive circuit array 1B and a light-emitting element array 2B, transmitted on an optical-fiber transmission line array 3B. The (n+1) channel optical pulse data sequence is optical-current converted by a light-receiving element array 4B, quantization-reproduced into (n+1) channel digital binary data sequence by a reception front-end circuit array 30B. The quantized binary data sequence is, using clock signal reproduced by clock channel, decoded into n-bit-wide 4-time-slot data, for each 5 time slots, by a decoding circuit 20B.

The maximum output power, which is to be restricted by safety and the lifetime and consumed power of the light-emitting element, of the multi-channel optical transmitter is determined by the sum of time average value of transmission power to be output from the respective channels. On the other hand, the minimum level of receive light of the multi-channel optical receiver is determined by the amplitude of original signal pulse to be input to the respective channels.

In this embodiment, the ratio of the sum of the bit number of luminous parts to the sum of bit number of non-luminous parts of the respective channels is less than 1. On the contrary, in the conventional transmission system, the coding is such that the ratio of the sum of the bit number of luminous parts to the sum of bit number of non- luminous parts of the respective channels is 1 (mark ratio of ½). Thus, the time average value of optical power corresponding to the minimum amplitude of receive light is reduced that in the conventional transmission system. Therefore, the minimum level of receive light defined by the time average value can be enhanced, and the transmitter-receiver allowable loss can be also enhanced.

In other words, ' the maximum allowable optical pulse amplitude corresponding to the maximum allowable transmit optical power determined by the sum of the time average value of transmit optical power of the respective channels can be enhanced. So, even when the amplitude of transmit optical signal increases, the restriction by safety etc. cannot be exceeded, therefore the transmitter-receiver allowable loss can be enhanced.

Although, in this embodiment, the optical-fiber transmission line 3B is used as multi-channel optical transmission line, another multi-channel optical transmission line. For example, changing the wavelength of light-emitting element array 2B at each channel, it may be transmitted through an optical-fiber transmission line or space propagation. Advantages of the Invention:

In this invention, by transmitting and receiving data using the transmission code that the ratio of time of luminous part to time of non-luminous part in a time section longer than one cycle of synchronous clock for transmitted data is less than 1, the restriction for the output power of transmit light by safety and the lifetime and consumed power of light-emitting element, and the restriction for the minimum level of receive light by the interference of extraneous white light or electrical crosstalk can be overcome, therefore the transmitter-receiver allowable loss can be enlarged. Also, an enhancement in transmission speed and transmission distance for optical data link using a PCM transmission system, especially a multi-channel optical link where multiple light-emitting elements are integrated, an optical wireless transmission, a plastic-fiber optical link, can be achieved.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A binary optical transmission system for transmitting and receiving a target transmit data, said data comprising a binary optical data composed of a luminous part and a non-luminous part, the system comprising:

transmission means for:
coding data such that a ratio of the time of the luminous part to the time of the non-luminous part is less than 1; and
transmitting said data, wherein the transmission time of said data is longer than one cycle of a transmission clock used to transmit said data; and
reception means for detecting a coded incoming signal.

2. A binary optical transmission system, according to claim 1, wherein:

said coding is a nBmB block-coding that a n-bit digital data sequence is converted into a m-bit digital data sequence, where n and m each are a positive integer.

3. A binary optical transmission system, according to claim 2, wherein:

said n is 8 or more and said m is 10 or more.

4. A binary optical transmission system, according to claim 1, wherein:

said time section is around 10 times longer than one cycle of said transmission clock.

5. A binary optical transmission system for transmitting and receiving an arbitrary bit sequence comprising a binary optical data composed of luminous part and non-luminous part, the system comprising:

means for:

converting said bit sequence into a bit sequence having a ratio of bit number of luminous parts to bit number of non-luminous parts, whereby the ratio being less than 1; and transmitting said data, wherein the transmission time of said data is longer than one cycle of a transmission clock used to transmit said bit sequence; and means for detecting a coded incoming signal.

6. A binary optical transmission system, according to claim 5, wherein:

said coding is a nBmB block-coding that a-n-bit digital data sequence is converted into a m-bit digital data sequence, where n and m each are a positive integer.

7. A binary optical transmission system, according to claim 6, wherein:

said n is 8 or more and said m is 10 or more.

8. A binary optical transmission system, according to claim 5, wherein:

said time section is around 10 times longer than one cycle of said transmission clock.

9. A binary optical transmission system for transmitting and receiving a target transmit data through each of multiple transmit-receive channels composing a multi-channel optical data link, said data comprising a binary optical data composed of luminous part and non-luminous part, the system comprising:

transmission means for:

coding data whereby a ratio of the sum of time of luminous parts at each of said multiple transmit-receive channels to the sum of time of non-luminous parts at each of said multiple transmit-receive channels is less than 1; and transmitting said data, wherein a transmission time is longer than one cycle of a transmission clock used to transmit said data at each of said multiple transmit-receive channels; and reception means for detecting a coded incoming signal.

10. A binary optical transmission system, according to claim 9, wherein:

said coding is a nBmB block-coding that an-bit digital data sequence is converted into a m-bit digital data sequence, where n and m each are a positive integer.

11. A binary optical transmission system, according to claim 10, wherein:

said n is 8 or more and said m is 10 or more.

12. A binary optical transmission system, according to claim 9, wherein:

said time section is around 10 times longer than one cycle of said transmission clock.

13. A binary optical transmission system for transmitting and receiving an arbitrary bit sequence through each of multiple transmit-receive channels composing a multi-channel optical data link, said data comprising a binary optical data composed of luminous part and non-luminous part, the system comprising:

transmission means for:

converting said bit sequence into a bit sequence having a ratio where the sum of bit number of luminous parts to the sum of bit number of non-luminous parts is less than 1; and transmitting said bit sequence, wherein a transmission time is longer than one cycle of a transmission clock used to transmit said bit sequence at each of said multiple transmit-receive channels; and reception means for detecting a coded incoming signal.

14. A binary optical transmission system, according to claim 13, wherein:

said coding is a nBmB block-coding that a n-bit digital data sequence is converted into a m-bit digital data sequence, where n and m each are a positive integer.

15. A binary optical transmission system, according to claim 14, wherein:

said n is 8 or more and said m is 10 or more.

16. A binary optical transmission system, according to claim 13, wherein:

said time section is around 10 times longer than one cycle of said transmission clock.

17. A binary optical transmission system for transmitting and receiving a target transmit data, said data comprising a binary optical data composed of luminous part and non-luminous part, the system comprising:

transmission means for:

coding said data, whereby a ratio of time of luminous parts to time of non-luminous parts being less than 1; and transmitting said data, wherein the time to transmit said data is longer than one cycle of a synchronous clock for said target transmit data; and reception means composed of means for detecting an average value between the peak value and the bottom value of a waveform of binary data and a bottom value of the reverse waveform of said binary data waveform, and means for determining the logic level of said binary data using the detected intermediate value.

18. A binary optical transmission system, according to claim 17, wherein:

said coding is a nBmB block-coding that a n-bit digital data sequence is converted into a m-bit digital data sequence, where n and m each are a positive integer.

19. A binary optical transmission system, according to claim 18, wherein:

said n is 8 or more and said m is 10 or more.

20. A binary optical transmission system, according to claim 17, wherein:

said time section is around 10 times longer than one cycle of said transmission clock.

21. A binary optical transmission system for transmitting and receiving an arbitrary bit sequence, said sequence comprising a binary optical data composed of luminous part and non-luminous part, the system comprising:

transmission means for:

converting said bit sequence into a bit sequence having a ratio of bit number of luminous parts to bit number of non-luminous parts being less than 1; and transmitting said sequence, wherein the time to transmit is longer than one cycle of a transmission clock used to transmit said bit sequence; and reception means composed of means for detecting an average value between the peak value and the bottom value of a waveform of binary data, and means for determining the logic level of said binary data using the detected intermediate value.

22. A binary optical transmission system, according to claim 21, wherein:
said coding is a nBmB block-coding that a n-bit digital data sequence is converted into a m-bit digital data sequence, where n and m each are a positive integer.

23. A binary optical transmission system, according to claim 22, wherein:
said n is 8 or more and said m is 10 or more.

24. A binary optical transmission system, according to claim 21, wherein:
said time section is around 10 times longer than one cycle of said transmission clock.

25. A binary optical transmission system for transmitting and receiving a target transmit data through each of multiple transmit-receive channels composing a multi-channel optical data link, said data comprising a binary optical data composed of luminous part and non-luminous part, the system comprising:
transmission means for:
a coding said data, whereby the ratio of the sum of time of luminous parts to the sum of time of non-luminous parts is less than 1; and
transmitting said data, wherein the time to transmit is longer than one cycle of a transmission clock used to transmit said target transmit data at each of said multiple transmit-receive channels; and
reception means composed of means for detecting an average value between the peak value and the bottom value of a waveform of binary data, and means for determining the logic level of said binary data using the detected intermediate value.

26. A binary optical transmission system, according to claim 25, wherein:
said coding is a nBmB block-coding that a n-bit digital data sequence is converted into a m-bit digital data sequence, where n and m each are a positive integer.

27. A binary optical transmission system, according to claim 26, wherein:
said n is 8 or more and said m is 10 or more.

28. A binary optical transmission system, according to claim 25, wherein:
said time section is around 10 times longer than one cycle of said transmission clock.

29. A binary optical transmission system for transmitting and receiving an arbitrary bit sequence through each of multiple transmit-receive channels composing a multi-channel optical data link, said sequence comprising a binary optical data composed of luminous, the system comprising:
transmission means for:
converting said bit sequence into a bit sequence having a ratio of the sum of bit number of luminous parts to the sum of bit number of non-luminous parts, whereby the ratio being less than 1; and
transmitting said data, wherein the time the transmit is longer than one cycle of a transmission clock used to transmit said bit sequence at each of said multiple transmit-receive channels; and
reception means composed of means for detecting an average value between the peak value and the bottom value of a waveform of binary data, and means for determining the logic level of said binary data using the detected intermediate value.

30. A binary optical transmission system, according to claim 29, wherein:
said coding is a nBmB block-coding that a n-bit digital data sequence is converted into a m-bit digital data sequence, where n and m each are a positive integer.

31. A binary optical transmission system, according to claim 30, wherein:
said n is 8 or more and said m is 10 or more.

32. A binary optical transmission system, according to claim 29, wherein:
said time section is around 10 times longer than one cycle of said transmission clock.

* * * * *